May 9, 1961  C. A. M. TAYLER  2,983,405
INERT GAS SUPPLY SYSTEM FOR AIRCRAFT FUEL TANKS
Filed June 6, 1958
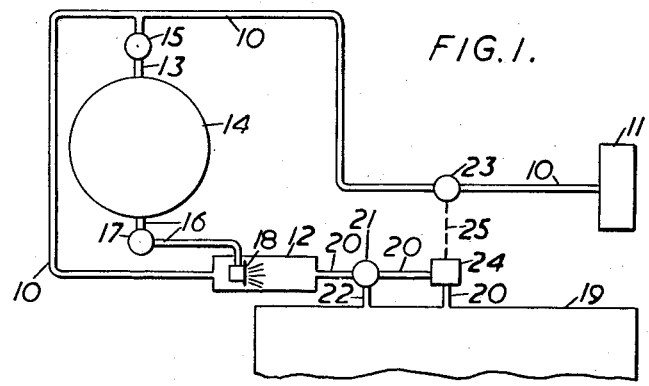
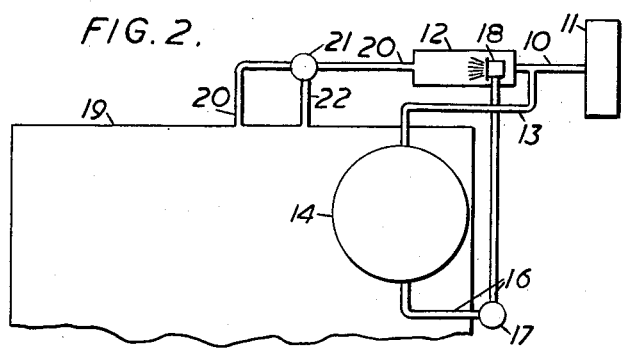
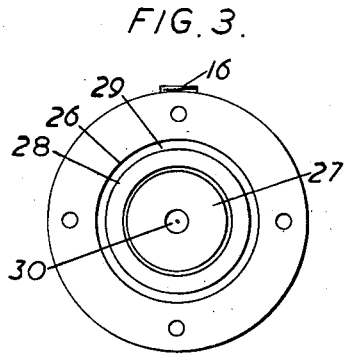 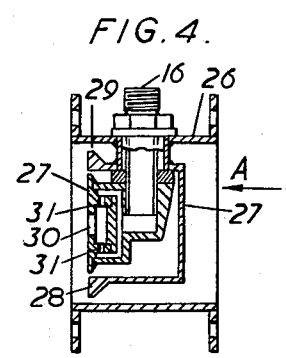
Inventor
COLIN ANDREW MILLAR TAYLER
By
Aaron R. Townshend  Attorney United States Patent Office 2,983,405
Patented May 9, 1961

2,983,405
INERT GAS SUPPLY SYSTEM FOR AIRCRAFT FUEL TANKS

Colin Andrew Millar Tayler, Harlow, England, assignor to The British Oxygen Company Limited, a British company Filed June 6, 1958, Ser. No. 740,408
Claims priority, application Great Britain June 26, 1957
4 Claims. (Cl. 220—88)

The present invention relates to a system for pressurizing the fuel tank of an aircraft, providing continuous combat protection against explosion, and in the case of high speed aircraft to prevent spontaneous ignition of the fuel at the elevated skin temperatures reached during flight.

It is known to supply nitrogen to aircraft fuel tanks either from high pressure gas storage cylinders or a liquid gas storage container having an associated vaporizer apparatus, but both these systems have the disadvantages arising from the weight of the equipment needed to carry sufficient nitrogen and the useful space which it occupies in the aircraft. The liquid gas system is more economical in these respects but the disadvantages still exist, particularly as regards high speed aircraft capable of rapid rates of descent, in that a large vaporizer is necessary to provide a high rate of gas flow to maintain constant tank differential pressure as barometric pressure increases during a dive.

The object of the present invention is to provide an improved system for supplying inert gas which will not support combustion to an aircraft fuel tank, in which the abovementioned disadvantages are still further reduced and a considerable economy in the consumption of nitrogen is achieved.

It has been discovered that air of which the oxygen content is suitably reduced is an inert gas which is suitable for this purpose, and according to the present invention compressed air is diluted with nitrogen, the nitrogen being mixed with the air in such proportion as to provide an inert gas for supplying to a fuel tank. The nitrogen may be stored in the aircraft in either gaseous or liquefied form.

Conveniently the compressed air supply is provided by a bleed-off from an existing source on the aircraft, e.g. the air compressor of a turbine engine or ram air, but this does not preclude other sources of compressed air, or the provision where necessary of a special source of supply.

In another feature of the invention, the same compressed air is utilised to pressurise a storage container containing liquid nitrogen so as to effect the mixing of the latter into the compressed air to form the inert gas.

In a further feature of the invention the compressed air and the liquid nitrogen enter a mixing device, each at the same pressure due to pressurizing of the liquid nitrogen storage container by the air supply, through respective metering orifices which are of such relative flow capacity as to maintain the required ratio of nitrogen to compressed air for mixing to provide an inert gas substantially constant for different total mass flow rates.

In a still further feature of the invention the liquid nitrogen container is located within the fuel tank to which the inert gas is supplied.

Embodiments of the invention will now be described with reference to the accompanying drawings, in which:

Fig. 1 is a circuit diagram illustrating one form of the invention.

Fig. 2 is another circuit diagram illustrating a different form of the invention.

Fig. 3 is an end elevation of an atomizing device for use in mixing compressed air and liquid nitrogen.

Fig. 4 is a sectional side elevation of Fig. 3.

Referring to Fig. 1 of the drawings, an inlet duct 10 to the inert gas supply system conveys compressed air bled-off from an aircraft engine compressor, indicated at 11, to a mixing chamber 12. A parallel tapping 13 from the duct 10 conveys a portion of the compressed air to a heat-insulated liquid nitrogen container 14 via a pressure-regulating valve 15. Liquid nitrogen is conveyed from the bottom of the container 14 by a duct 16, via a non-return valve 17 to a swirl atomizer or other suitable form of injector indicated at 18 in the mixing chamber 12, where the liquid gas vaporises and mixes with the compressed air to form an inert gas which is fed to the fuel tank 19 via the duct 20.

The feed of inert gas to the tank 19 is governed by a supply control valve 21 in the duct 20. The valve 21 is of the pressure-actuated type well-known per se, and is sensitive to the internal pressure of the tank 19 through the pressure connection 22, the arrangement being such that the supply control valve 21 operates automatically in response to variations in a pre-determined pressure differential between the internal pressure of the tank 19 and the ambient pressure, so as to maintain said pressure differential substantially constant. The valve 21 therefore operates as a demand valve, which opens automatically to supply inert gas to the fuel tank only when a demand for such gas arises due to a drop in the pressure differential between the tank and the ambient pressure. Maximum demand occurs when the aircraft is diving rapidly and the rapidly increasing ambient pressure necessitates a corresponding rapid increase of the internal pressure of the tank 19.

It has been calculated that in order to obtain an inert gas at a suitable temperature for pressurizing a fuel tank by mixing liquid nitrogen with compressed air, the latter needs to be at a suitably high temperature when the liquid nitrogen is sprayed into it. In Fig. 1, air supply control can be affected automatically by providing an adjustable metering valve 23 in the air supply duct 10, while a thermostat 24 is located in the inert gas supply duct 20, at or near the point at which said duct 20 enters the fuel tank 19. The thermostat indicated at 24 is therefore sensitive to the final temperature of the inert gas mixture supplied to the tank 19 and an operative connection is indicated at 25 between the thermostat 24 and the metering valve 24, whereby the latter is actuated automatically to control the compressed air supply in dependence upon the final temperature of the inert gas mixture.

The estimated proportion of oxygen in the final mixture if the latter is to be inert has been found to be 13.6%, this being the estimated maximum safe percentage of oxygen, and it has also been calculated that if air at a delivery temperature of 200° C. is mixed with liquid nitrogen in suitable proportions for a final mixture temperature of −50° C., the oxygen content will be approximately 13.35%. Engine compressor air can be expected to be above this value of 200° C. on high speed aircraft, so it will be appreciated that with the thermostat 24 set to maintain an inlet temperature of in the −50° C. by appropriate effect upon the air supply metering valve 23, this control is the only requirement for both oxygen content and final temperature of the inert gas mixture supplied to the tank 19. As already stated, engine compressor air is usually above 200° C., and in fact normally so far above this value that the thermostat 24 can usefully operate to give a final mixture temperature in the range −50° C. to +30° C., but it is not outside the scope of this invention to provide heating of the compressed air supply to the desired estimated temperature of 200° C. This heating could be necessary or desirable where automatic control is required when the air supply source is not provided by the aircraft engine, or where the supply is taken from the engine but is at an abnormally low temperature e.g. when the engine is idling.

In operation of the system shown in Fig. 1 a demand registered by a fall in the fuel tank differential pressure over ambient pressure causes the inert gas supply control valve 21 to open so that feeding of liquid nitrogen to the mixing chamber 12 commences, the quantity of air required to evaporate the nitrogen and provide inert gas at the required delivery temperature being regulated by the valve 23 controlled by the thermostat 24.

In the system shown in Fig. 2, like parts of those shown in Fig. 1 bear like reference numerals, and it will be seen that the pressure regulating valve 15, the metering valve 23, and the thermostat 24 have been dispensed with. In addition, the liquid nitrogen storage container 14 is mounted within the fuel tank 19, but this feature is also applicable to the system shown in Fig. 1, if desired, thereby providing a desirable space economy advantage. The proportion of the volume of the tank occupied by the container 14 is negligible and has been found in practice to be approximately two-thousandths of the total volume of fuel carried.

In the system shown in Fig. 2, it will be noted that the liquid nitrogen container 14 is pressurized by the compressed air directly through the duct 13, so that liquid nitrogen delivered to the mixing chamber 12 through the duct 16 is at the same pressure as the air delivered to the mixing chamber through the duct 10. Respective air and liquid nitrogen discharge orifices are provided, as hereafter described, to give the required ratio of nitrogen to compressed air for mixing in the chamber 12 to provide an inert gas. It follows that since the compressed air and liquid nitrogen are always at the same pressure, irrespective of fluctuations in the pressure of the air supply, that the metering orifices will maintain the predetermined ratio of nitrogen to compressed air substantially constant for different total mass flow rates determined by the valve 21.

Referring now to Figs. 3 and 4, which show constructional details of a mixing device for the compressed air and liquid nitrogen, the cylindrical tube 26 is intended to form the rearmost end of the mixing chamber 12 of Fig. 2. Compressed air flows along the tube 26 in the direction of the arrow A in Fig. 4, i.e. from the duct 10 of of Fig. 2. A cup-shaped body 27 is mounted concentrically within the tube 26 with its base confronting the air stream. The liquid nitrogen supply conduit 16 extends radially through the wall of the tube 26 and terminates in a liquid nitrogen outlet nozzle 27. The cup-shaped body 27 has a rim 28 which defines with the wall of the tube 26 an annular air discharge orifice 29 of predetermined flow area. The liquid nitrogen nozzle 27 has a central outlet 30, which is also of predetermined flow area and is in substantially the same plane as the rim 28 of the cup-shaped body 27. To the rear of the outlet 30 in the liquid nitrogen nozzle, the internal construction provides radially-disposed flow passages 31 which function to provide a radial spray pattern of liquid nitrogen from the outlet 30 into the surrounding annular air stream leaving the orifice 29. This air and liquid nitrogen mixing device, with its orifices of predetermined flow area, is essential to the system shown in Fig. 2 and described above, but it can also be used with the system shown in Fig. 1.

This invention provides an inert gas supply system for fuel tanks which has the major advantage of compact and lightweight design, especially when the liquid nitrogen container is within the fuel tank, and while it provides continuous protection, considerable economy of liquid nitrogen is achieved over previous systems employing 100% nitrogen in pressurizing fuel tanks.

In the accompanying drawings and description, it will be appreciated that no mention or showing has been made of conventional equipment associated with a liquefied gas container, e.g. a filling valve, vent valve, and pressure relief valves, since such equipment and its function is well-known to those skilled in the art.

What I claim is:

1. Process for pressurizing the fuel tank of an aircraft and providing protection against explosion and spontaneous ignition by the known method of supplying a mixture of air and inert gas to said tank, comprising the steps of establishing a supply of hot compressed air at a temperature of the order of and not less than 200° C., spraying liquid nitrogen directly into said hot compressed air to provide a gaseous mixture, feeding said gaseous mixture to the fuel tank for pressurizing thereof, and ensuring a sufficiency of nitrogen by the step of metering said supply of compressed air in dependence upon the final temperature of said gaseous mixture to maintain said final temperature substantially constantly of the order of −50° C.

2. Process for pressurizing the fuel tank of an aircraft and providing protection against explosion and spontaneous ignition by the known method of supplying a mixture of air and inert gas to said tank, comprising the steps of establishing a supply of hot compressed air from an engine of said aircraft, diluting said compressed air with gaseous nitrogen by spraying liquid nitrogen directly into it, feeding the gaseous mixture thereby produced to the fuel tank of the aircraft at such a rate as to maintain a predetermined pressure differential between the internal pressure of the tank and ambient pressure, and maintaining the ratio of gaseous nitrogen to compressed air in said mixture at such high proportion of nitrogen that the oxygen content thereof is kept to a reduced level at which said mixture is an inert gas by the step of metering said supply of compressed air in dependence upon the final temperature of the gaseous mixture.

3. Apparatus for pressurizing the fuel tank of an aircraft and providing protection against explosion and spontaneous ignition by the known method of supplying a mixture of air and inert gas to said tank, comprising a source of hot compressed air in said aircraft, a liquid nitrogen container in said aircraft, a mixing chamber, a first conduit connecting said source of hot compressed air to said mixing chamber, a spray device in said mixing chamber, a second conduit connecting said spray device with said liquid nitrogen container for supply of liquid nitrogen to said device, a third conduit connecting said liquid nitrogen container with said source of compressed air for pressurizing said container to promote flow of liquid nitrogen therefrom to the spray device, a fourth conduit connecting said mixing chamber with said fuel tank for feeding compressed air diluted with nitrogen to said tank, a demand valve in said fourth conduit for controlling flow therethrough in dependence upon pressure within the fuel tank in relation to ambient pressure, a metering valve in said first conduit, a thermostat subject to temperature conditions of the mixture of compressed air and nitrogen at the point at which it enters the fuel tank, and an operative connection between said thermostat and said metering valve whereby said valve is actuated automatically to control the supply of hot compressed air to the mixing chamber in dependence upon the final temperature of said mixture and for maintaining said final temperature substantially constant.

4. Apparatus for pressurizing the fuel tank of an aircraft and providing protection against explosion and spontaneous ignition by the known method of supplying a mixture of air and inert gas to said tank, comprising a source of hot compressed air in said aircraft, a liquid nitrogen container in said aircraft, a tubular mixing chamber, a first conduit connecting said source of compressed air to said mixing chamber so that compressed air flows along said chamber, a cup-shaped body mounted concentrically within the tubular mixing chamber with its base confronting the stream of compressed air, the rim of said body and the wall of said chamber defining an air metering orifice of predetermined flow area, a second conduit connecting the liquid nitrogen container with the interior of the cup-shaped body and the latter having an outlet nozzle of predetermined flow area which functions as a metering orifice, a third conduit connecting said compressed air source with the liquid nitrogen container for pressurizing said container to the same pressure as the compressed air, a fourth conduit connecting the mixing chamber with the fuel tank for feeding compressed air diluted with nitrogen to said tank, and a demand valve in said fourth conduit for controlling the flow therethrough to maintain a predetermined minimum pressure differential between the internal pressure of the tank and ambient pressure.

References Cited in the file of this patent

UNITED STATES PATENTS

| | | |
|---|---|---|
| 2,870,936 | Clayton | Jan. 27, 1959 |

FOREIGN PATENTS

| | | |
|---|---|---|
| 40,247 | Switzerland | Feb. 7, 1914 |
| 467,334 | Great Britain | June 14, 1937 |
| 716,136 | France | Oct. 5, 1931 |
| 903,293 | France | Jan. 11, 1945 |